United States Patent [19]
Stickling

[11] Patent Number: 5,996,429
[45] Date of Patent: Dec. 7, 1999

[54] EARTH WORKING APPARATUS HAVING A SENSOR ASSEMBLY ATTACHED THERETO AND ASSOCIATED METHOD

[75] Inventor: Christopher J. Stickling, Dunlap, Ill.

[73] Assignee: Caterpillar Inc., Peoria, Ill.

[21] Appl. No.: 08/951,114

[22] Filed: Oct. 15, 1997

[51] Int. Cl.⁶ .................................................. G01B 7/30
[52] U.S. Cl. ......................................................... 73/866.1
[58] Field of Search ................................. 73/866.1, 493, 73/494, 511, 514.39, 527; 340/686.1–686.6; 324/207.23–207.25, 166–168; 37/414, 415

[56] References Cited

U.S. PATENT DOCUMENTS

| | | | |
|---|---|---|---|
| 2,579,806 | 12/1951 | Dvorkin | 73/527 |
| 3,686,507 | 8/1972 | Krutz et al. | 324/168 |
| 5,627,467 | 5/1997 | Lee et al. | 324/207.25 |
| 5,735,066 | 4/1998 | Tochizawa et al. | |

FOREIGN PATENT DOCUMENTS

| | | | |
|---|---|---|---|
| 404161858 | 6/1992 | Japan | 324/166 |

*Primary Examiner*—Robert Raevis
*Attorney, Agent, or Firm*—Paul Maginot; Steve D. Lundquist

[57] ABSTRACT

An earth working apparatus includes a first machine component and a second machine component which is movable relative to the first machine component. The apparatus also includes a motor for moving the second machine component relative to the first machine component, wherein the motor includes a motor shaft. The apparatus also includes a housing secured to the first machine component, the housing having a chamber defined therein. The apparatus further includes a sensor positioned within the chamber of the housing, wherein (1) the sensor includes a sensor body and a sensor shaft, (2) the sensor body is fixed in relation to the housing, and (3) the sensor shaft is movable in relation to the housing. The apparatus also includes a linkage assembly which mechanically couples the motor shaft to the sensor shaft.

8 Claims, 7 Drawing Sheets

EARTH WORKING APPARATUS HAVING A SENSOR ASSEMBLY ATTACHED THERETO AND ASSOCIATED METHOD

BACKGROUND OF THE INVENTION

The present invention relates generally to an earth working apparatus, and more particularly to an earth working apparatus having a sensor assembly attached thereto which detects relative position between various components of the earth working apparatus.

Earth working apparatus, such as excavators, typically have a frame, a first machine component, a second machine component and an articulating arm. The first machine component typically includes a track assembly. The second machine component typically includes a body assembly. The body assembly generally includes a cab and an engine enclosure. The frame is mounted on the track assembly. The body assembly is rotatably mounted on the frame. One end of the articulating arm is secured to the body assembly.

A motor is mechanically coupled to the body assembly such that an operator of the earth working apparatus can control rotation of the body assembly relative to the track assembly. For example, the operator can control rotation of the body assembly so as to position the articulating arm in a desired location for performing a digging function.

The motor for rotating the body assembly relative to the track assembly may be controlled by a computer located on the earth working apparatus. This computer must receive information relating to the spatial relationship between the body assembly and the track assembly in order to appropriately control rotation of the body assembly. One approach for providing the above described information to the computer is to attach sensors to the earth working apparatus which generate data regarding the spatial relationship between the body assembly and the track assembly. The data generated by the sensors is input into the computer so that the computer can appropriately position the body assembly relative to the track assembly in order to perform a work function such as digging. However, a problem with this approach is that such sensors are typically sensitive to adverse environmental conditions often found at excavation sites (e.g. moist or dusty environmental conditions). These sensors are also susceptible to damage from vibrations generated by the earth working apparatus. In addition, these sensors are prone to being struck and damaged by an object such as a rock.

It would therefore be desirable to provide an earth working apparatus having a sensor assembly attached thereto which better protects a sensor contained in the assembly from adverse environmental conditions. It would also be desirable to provide an earth working apparatus having a sensor assembly attached thereto which better protects a sensor contained in the assembly from vibrations generated by the earth working apparatus. It would further be desirable to provide an earth working apparatus having a sensor assembly attached thereto which better protects a sensor contained in the assembly from being struck and damaged by an object such as a rock.

SUMMARY OF THE INVENTION

In accordance with one embodiment of the present invention there is provided an earth working apparatus. The apparatus includes a first machine component and a second machine component which is movable relative to the first machine component. The apparatus also includes a motor for moving the second machine component relative to the first machine component, wherein the motor includes a motor shaft. The apparatus also includes a housing secured to the first machine component, the housing having a chamber defined therein. The apparatus further includes a sensor positioned within the chamber of the housing, wherein (1) the sensor includes a sensor body and a sensor shaft, (2) the sensor body is fixed in relation to the housing, and (3) the sensor shaft is movable in relation to the housing. The apparatus also includes a linkage assembly which mechanically couples the motor shaft to the sensor shaft.

It is still another object of this invention to provide an improved sensor assembly.

It is yet another object of this invention to provide a new and useful method for determining the position of a cab relative to a track assembly.

It is still another object of this invention to provide an earth working apparatus having a sensor assembly attached thereto which better protects a sensor contained in the assembly from vibrations generated by the earth working apparatus.

It is yet another object of this invention to provide an earth working apparatus having a sensor assembly attached thereto which better protects a sensor contained in the assembly from being struck and damaged by an object such as a rock.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
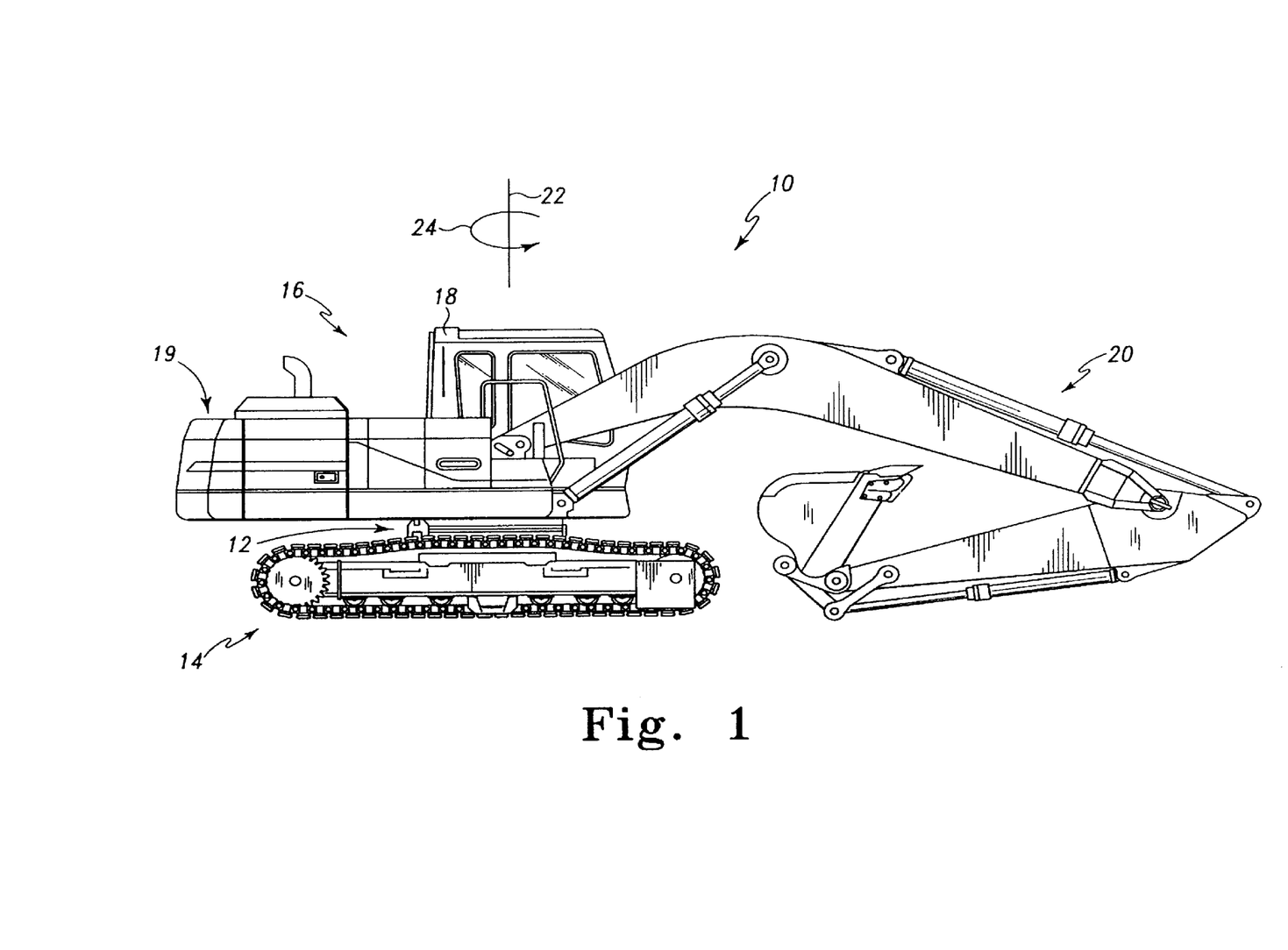
FIG. 1 is a side elevational view of an earth working apparatus which incorporates the features of the present invention therein.

Referring to FIG. 1, there is shown an earth working apparatus 10 which incorporates the features of the present invention therein. Earth working apparatus 10 includes a frame 12 and a first machine component, such as a track assembly 14. Earth working apparatus 10 also includes a second machine component, such as a body assembly 16. Body assembly 16 includes a cab 18 and an engine enclosure 19. Earth working apparatus 10 further includes an articulating arm 20.

Frame 12 is mounted on track assembly 14. Body assembly 16 is mounted on frame 12. One end of articulating arm 20 is secured to body assembly 16. Body assembly 16 is mounted on frame 12 such that body assembly 16 (and therefore articulating arm 20) can rotate relative to track assembly 14 around axis 22 in a direction indicated by arrow 24. Body assembly 16 (and therefore articulating arm 20) can also rotate relative to track assembly 14 around axis 22 in a direction opposite to the direction indicated by arrow 24.

Figure 2:
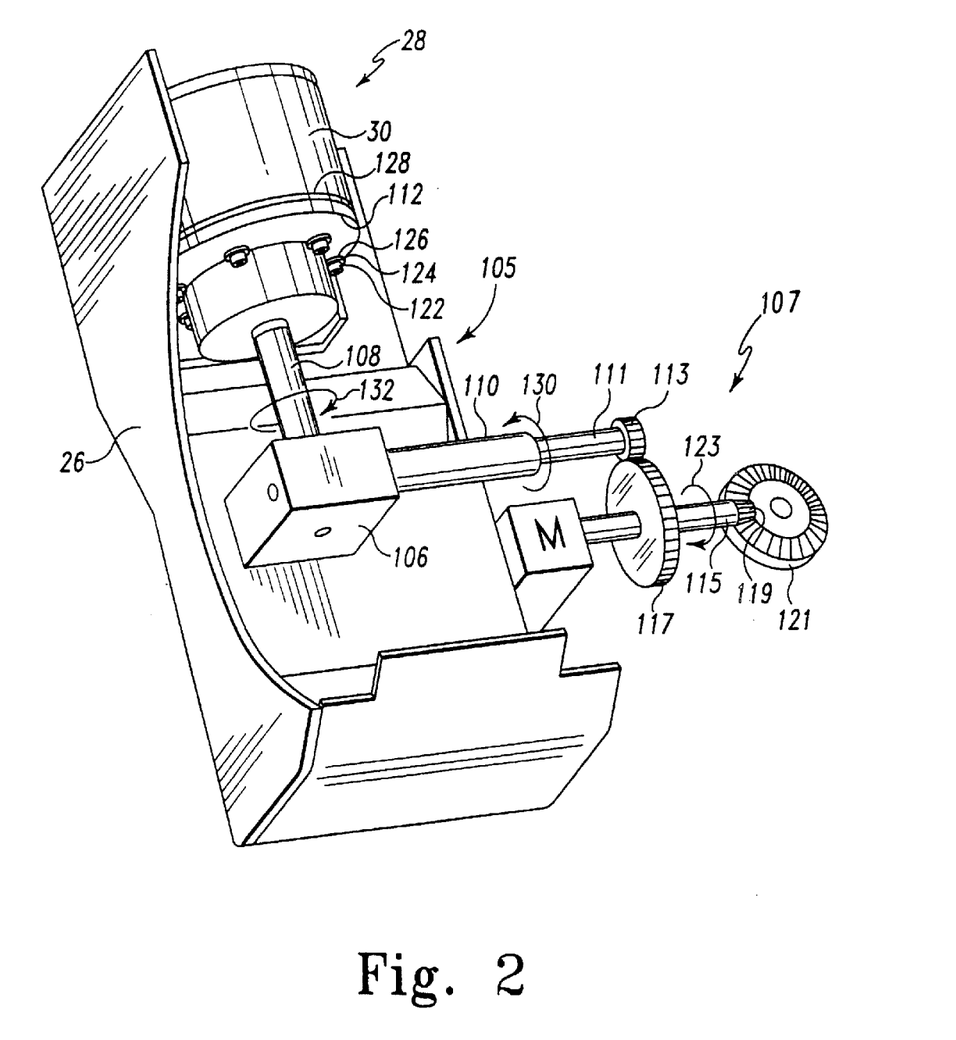
FIG. 2 is a perspective view of a sensor assembly, a linkage assembly and a guard plate of the earth working apparatus shown in FIG. 1, with the sensor assembly shown coupled to a motor, and the motor coupled to a ring gear.

Referring now to FIG. 2, earth working apparatus 10 also includes a guard plate 26, a sensor assembly 28, a linkage assembly 105 and a drive assembly 107. Drive assembly 107 includes a shaft 111, a gear 113, a motor M, a shaft 115, a gear 117 and a gear 119. Drive assembly 107 also includes a ring gear 121. Motor M is secured to body assembly 16 of earth working apparatus 10. Motor M is preferably a hydraulic motor. Gear 117 and gear 119 are fixed in relation to shaft 115. Gear 113 is fixed in relation to shaft 111. Shaft 111 is positioned relative to shaft 115 such that gear 113 meshingly engages gear 117. Shaft 115 is mechanically coupled to motor M such that motor M can rotate shaft 115 in a direction indicated by arrow 123. Motor M can also rotate shaft 115 in a direction opposite to the direction indicated by arrow 123. Rotation of shaft 115 causes shaft 111 to rotate in the direction indicated by arrow 130 via gears 113 and 117.

Ring gear 121 is fixed in relation to track assembly 14 of earth working apparatus 10. Shaft 115 is positioned relative to ring gear 121 such that gear 119 meshingly engages ring gear 121. Rotation of shaft 115 in the direction indicated by arrow 123 causes gear 119 to rotate in the direction indicated by arrow 123. Rotation of gear 119 in the direction of arrow 123 causes body assembly 16 (and therefore cab 18) to rotate relative to track assembly 14 around axis 22 in the direction indicated by arrow 24 (see FIG. 1). It should be understood that rotation of shaft 115 in the direction opposite to the direction indicated by arrow 123 causes body assembly 16 (and therefore cab 18) to rotate relative to track assembly 14 around axis 22 in the direction opposite to the direction indicated by arrow 24.

Linkage assembly 105 includes a set of reduction gears that define a worm gear reduction unit 106. An example of a worm gear reduction unit which can be used in the present invention is available from Stock Drive Products of New Hyde Park, New York, as part number 2Z18ME1000. Linkage assembly 105 also includes a first cylindrically shaped coupler 108 and a second cylindrically shaped coupler 110.

Worm gear reduction unit 106 includes a first axle (not shown) and a second axle (not shown) extending therefrom. The first axle and the second axle are mechanically coupled to the set of reduction gears (not shown) that define worm gear reduction unit 106. Second coupler 110 is positioned around an end of shaft 111 and around an end of the second axle. A set screw (not shown) is screwed through a slot (not shown) defined in second coupler 110 such that the set screw contacts shaft 111. Another set screw (not shown) is screwed through another slot (not shown) defined in second coupler 110 such that the set screw contacts the second axle extending from worm gear reduction unit 106. These two set screws prevent any relative rotational movement between shaft 111, second coupler 110 and the second axle.

First coupler 108 is positioned around an end of a sensor shaft 62 (see FIG. 3) and around an end of the first axle of worm gear reduction unit 106. A set screw (not shown) is screwed through a slot (not shown) defined in first coupler 108 such that the set screw contacts sensor shaft 62. Another set screw (not shown) is screwed through another slot (not shown) defined in first coupler 108 such that the set screw contacts the first axle. These two set screws prevent any relative rotational movement between sensor shaft 62, first coupler 108 and the first axle.

First coupler 108 and second coupler 110 are made from aluminum. Preferably, first coupler 108 and second coupler 110 compress when subjected to force. This ability to compress substantially decreases any force communicated to sensor shaft 62 during operation of earth working apparatus 10. In addition, first coupler 108 and second coupler 110 are able to compress and bend, and still effectively transfer torque between the first axle and sensor shaft 62, and between shaft 111 and the second axle, respectively. An example of a coupler that can be used as the first coupler and the second coupler in the present invention is available from Rocom Corp., located in Huntington Beach, Calif. as part number BT0050-56MM-56MM.

As shaft 111 is rotated in the direction indicated by arrow 130 by shaft 115, second coupler 110 and the second axle are also rotated in the direction indicated by arrow 130. Rotation of the second axle causes rotation of the set of reduction gears within the worm gear reduction unit 106. Rotation of the set of reduction gears causes the first axle, first coupler 108 and sensor shaft 62 to rotate in a direction indicated by the arrow 132. However, it should be understood that as shaft 115 rotates at a first speed sensor shaft 62 is caused to rotate at a second speed which is less than the first speed. Sensor shaft 62 rotates at the second speed as a result of having sensor shaft 62 mechanically coupled to shaft 115 through worm gear reduction unit 106, gear 113 and gear 117. Preferably, worm gear reduction unit 106 provides a gear reduction ratio of 100/1.

Figure 3:
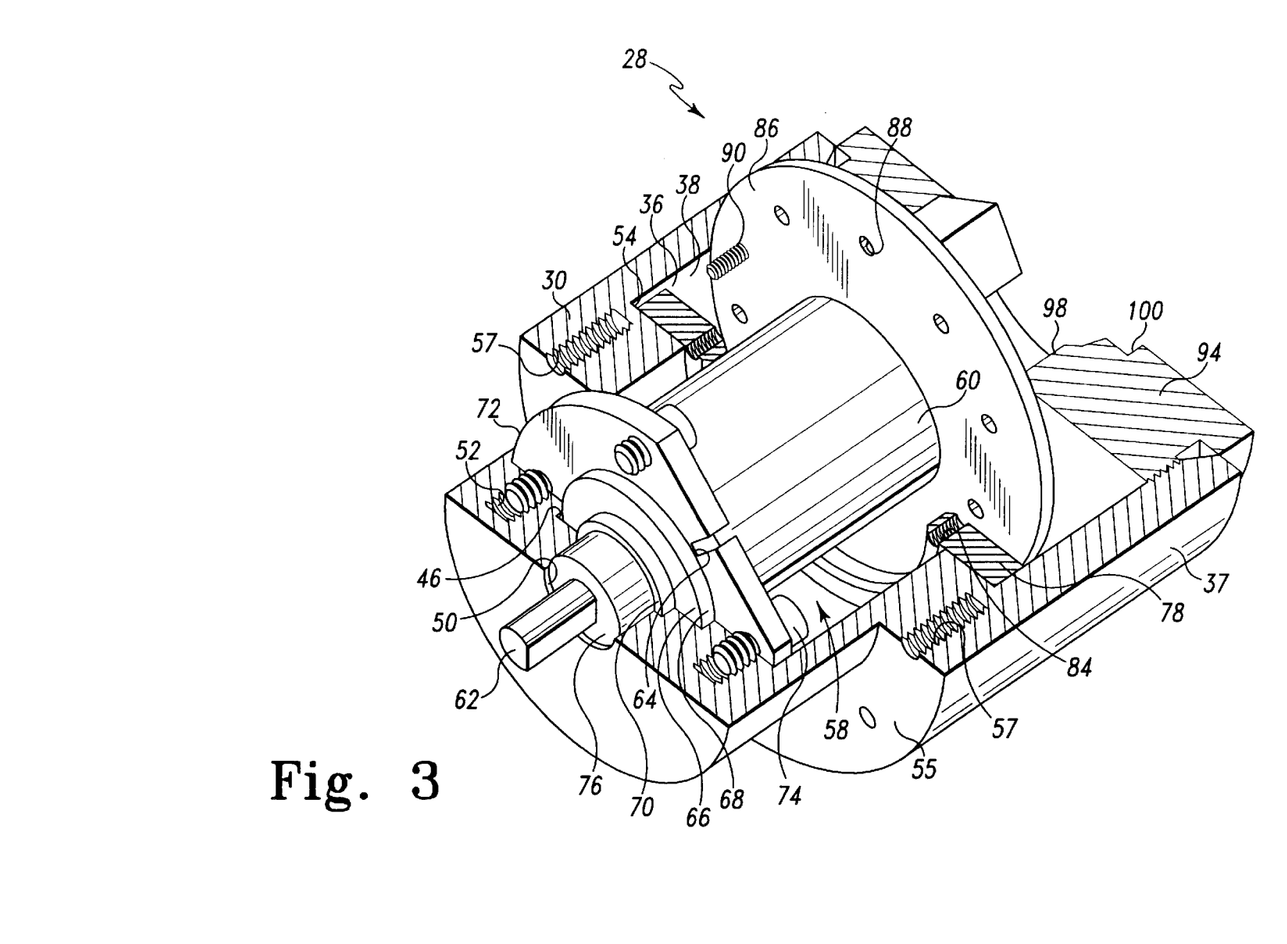
FIG. 3 is a partial cross sectional view of the sensor assembly shown in FIG. 2 (note that the sensor, the rubber washer, the clamp, and the circuit board are not shown in cross section, and note further that the bracket and the first coupler have been removed for clarity of description)

As shown in FIG. 3, sensor assembly 28 includes a housing 30, a sensor 58, a clamp 72, a rubber washer 76, an adapter 78, a circuit board 86, a cap 94 and a bracket 112 (see FIG. 2).

Figure 4:
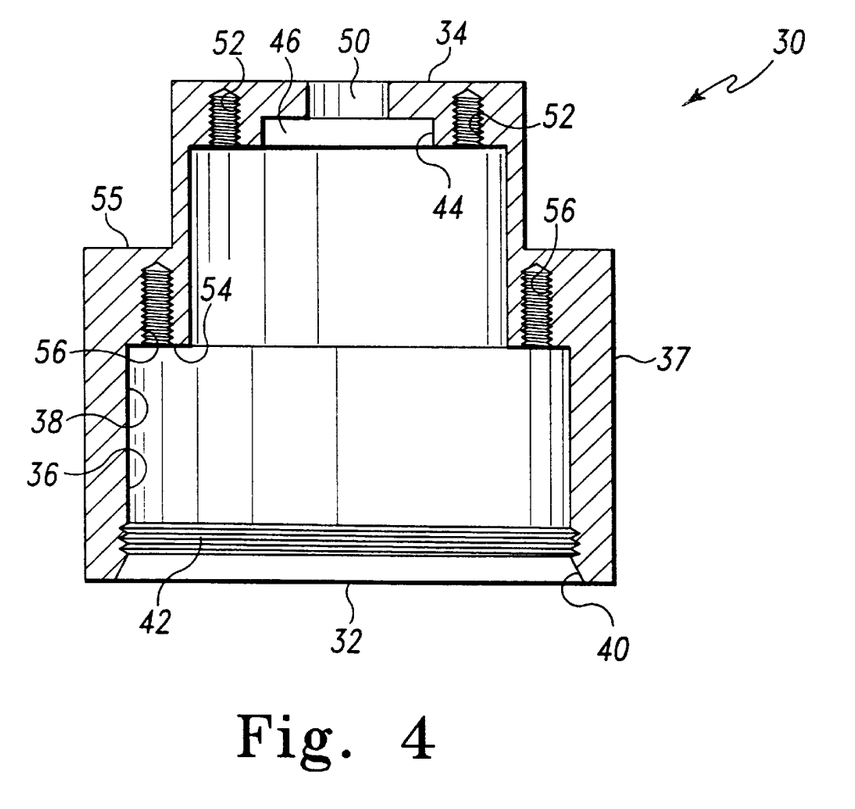
FIG. 4 is a cross sectional view of the housing shown in FIG. 3.

Referring now to FIG. 4, housing 30 includes a first end 32, a second end 34, an inner housing surface 36 and an outer housing surface 37. Housing 30 also includes a chamber 38 interposed between first end 32 and second end 34. Housing 30 also has a first sidewall segment 46 and a second sidewall segment 50. First sidewall segment 46 and second sidewall segment 50 define a passageway 44. A number of threads 42 are defined in inner housing surface 36 adjacent to an opening 40. Housing 30 further includes an interior shoulder surface 54 and an exterior shoulder surface 55. Housing 30 has a number of screw holes 52 defined therein which are located adjacent to passageway 44. Screw holes 52 open to the interior of housing 30. Housing 30 also has a number of screw holes 56 defined therein which open to the interior of housing 30. In addition housing 30 has a number of screw holes 57 (see FIG. 3), which open to the exterior of housing 30. Screw holes 52, 56 and 57 terminate at a location intermediate inner housing surface 36 and outer housing surface 37.

Referring back to FIG. 3, sensor 58 includes a sensor body 60 and sensor shaft 62. Sensor body 60 has a groove 64 formed therein. Sensor body 60 also has a first disk member 66 and a second disk member 70 attached thereto. First disk member 66 has a disk edge 68 defined thereon. First disk member 66 and second disk member 70 are positioned around sensor shaft 62. Sensor 58 is positioned in chamber 38 of housing 30 such that sensor shaft 62 extends through passageway 44 (see FIG. 4). Sensor 58 is further positioned in chamber 38 such that disk edge 68 contacts first sidewall segment 46. Rubber washer 76 is positioned within passageway 44 such that rubber washer 76 surrounds and contacts sensor shaft 62. Rubber washer 76 is further positioned in passageway 44 such that rubber washer 76 contacts second sidewall segment 50. It should be understood that positioning rubber washer 76 in the above described manner forms a fluid tight seal between chamber 38 and the external environment.

Clamp 72 includes a number of screw holes defined therein. An example of a clamp which can be used in the present invention is available from Caterpillar, Inc. of Peoria, Ill., as part number 919376. Clamp 72 is positioned relative to sensor 58 such that an inner peripheral edge of clamp 72 is located in groove 64. Clamp 72 is also positioned relative to housing 30 such that the screw holes defined in clamp 72 align with screw holes 52 (see FIG. 4) defined in housing 30. Screws 74 are screwed through the screw holes defined in clamp 72 and into screw holes 52. It should be appreciated that clamp 72 holds sensor body 60 in a fixed relationship with housing 30.

Figure 5:
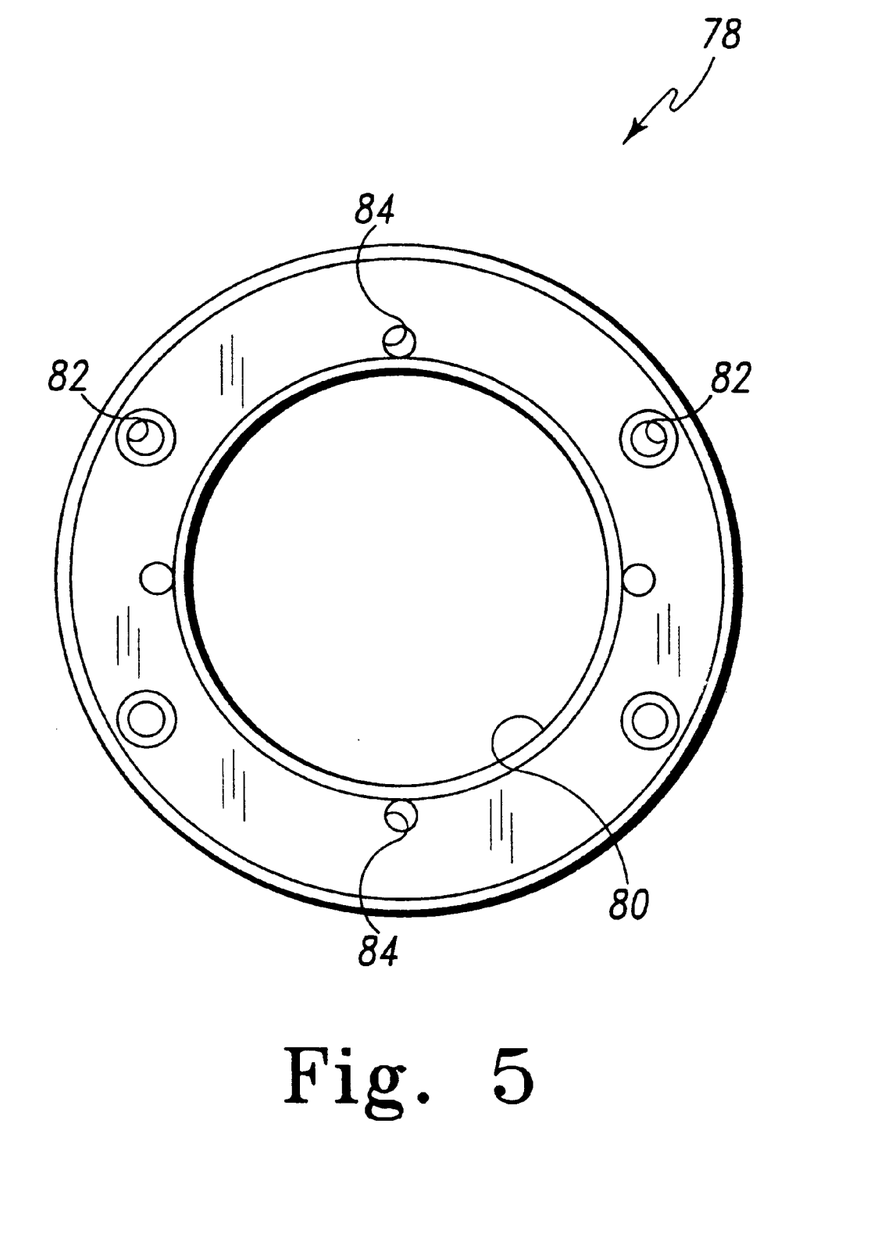
FIG. 5 is an elevational view of the adapter of the sensor assembly of FIG. 3.

Referring now to FIG. 5, adapter 78 has a central opening 80 defined therein. Adapter 78 also includes a number of screw holes 82 and 84 defined therein. As shown in FIG. 3, adapter 78 is positioned in chamber 38 such that sensor body 60 extends through central opening 80 (note that adapter 78 is shown in cross section in FIG. 3). Adapter 78 is further positioned in chamber 38 such that screw holes 82 align with screw holes 56 defined in housing 30 (see FIG. 4). Screws (not shown) are screwed through screw holes 82 defined in adapter 78, and into screw holes 56, thus mounting adapter 78 to housing 30.

Referring back to FIG. 3, circuit board 86 has an opening (not shown) and a number of screw holes 88 defined therein. Circuit board 86 includes circuitry thereon including a number of amplifier components as is well known in the art. Circuit board 86 is positioned in chamber 38 such that a portion of sensor body 60 extends into the hole defined in circuit board 86. Circuit board 86 is further positioned in chamber 38 such that circuit board 86 is juxtaposed to adapter 78 and screw holes 88 align with screw holes 84 defined in adapter 78 (see FIG. 5). Screws 90 are screwed through screw holes 88 defined in circuit board 86, and into screw holes 84, thus mounting circuit board 86 to adapter 78.

Figure 6:
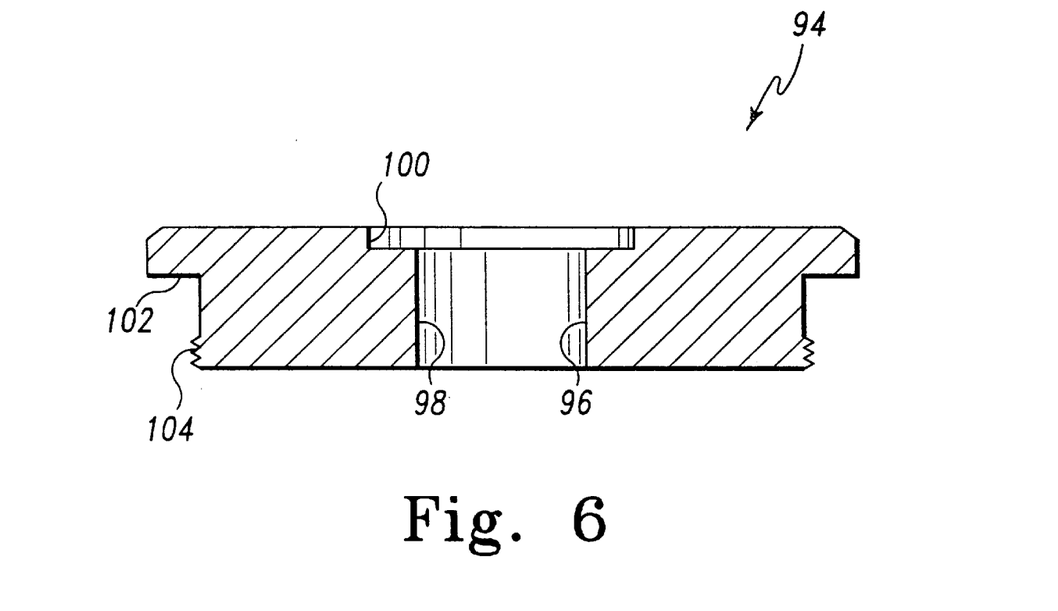
FIG. 6 is a cross sectional view of the cap of FIG. 3.

Referring now to FIG. 6, cap 94 includes a wall segment 98 and a wall segment 100. Wall segments 98 and 100 define a passageway 96 which extends through cap 94. Cap 94 also includes a lip 102 and a number of threads 104 formed thereon. Cap 94 is positioned relative to housing 30 such that a portion of cap 94 extends through opening 40 and threads 104 meshingly engage threads 42 (see FIG. 4). As cap 94 is rotated relative to housing 30, lip 102 contacts first end 32 (see FIG. 4) of housing 30. It should be understood that the above described arrangement forms a fluid tight seal between cap 94 and housing 30.

Figure 7:
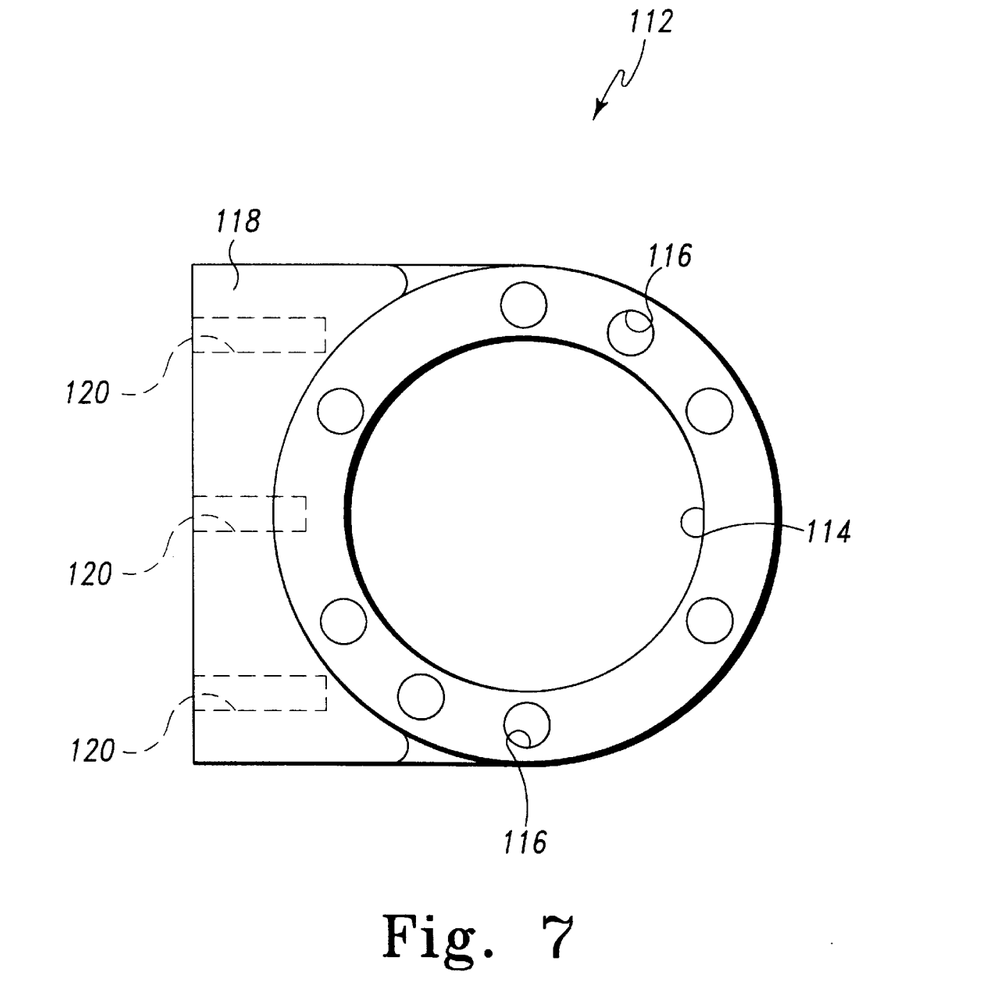
FIG. 7 is side elevational view of the bracket of FIG. 2.

Referring now to FIG. 7, bracket 112 has a central opening 114 and a number of screw holes 116 defined therein. Bracket 112 includes a securement portion 118. Securement portion 118 has a number of bolt holes 120 (shown in phantom) defined therein. As shown in FIG. 2, bracket 112 is positioned relative to housing 30 such that a portion of housing 30 extends through central opening 114.

Bracket 112 is further positioned relative to housing 30 such that screw holes 116 align with screw holes 57 (see FIG. 3) defined in housing 30. A washer 124 is disposed around each screw 122 (see FIG. 2). Screws 122 are screwed through screw holes 116 and into screw holes 57, thus mounting bracket 112 to housing 30. A rubber washer 128 (see FIG. 2) is interposed between exterior shoulder surface 55 of housing 30 and bracket 112. A rubber washer 126 is interposed between each washer 124 and bracket 112. Rubber washer 128 and rubber washers 126 decrease the vibrations communicated to sensor assembly 28 during use of earth working apparatus 10. It should be understood that additional rubber washers can be interposed between exterior shoulder surface 55 of housing 30 and bracket 112. It should also be understood that additional rubber washers can be interposed between each washer 124 and bracket 112. Adding additional rubber washers as described above can further decrease the vibrations communicated to sensor assembly 28 during use of earth working apparatus 10.

It should be appreciated that the number of screws 122 used to mount bracket 112 to housing 30 can be varied depending upon the frequency of the vibrations being communicated to sensor assembly 28. For example, if sensor assembly 28 is being subjected to high frequency vibrations, it is preferred that the number of screws 122 used to mount bracket 112 to housing 30 be increased. Increasing the number of screws 122 used to mount bracket 112 to housing 30 will decrease the high frequency vibrations communicated to sensor assembly 28. On the other hand if sensor assembly 28 is being subjected to low frequency vibrations, it is preferred that the number of screws 122 used to mount bracket 112 to housing 30 be decreased. Decreasing the number of screws 122 used to mount bracket 112 to housing 30 will decrease the low frequency vibrations communicated to sensor assembly 28.

Referring again to FIG. 2, bracket 112 is positioned relative to guard plate 26 such that bolt holes 120 (see FIG. 7) align with holes (not shown) defined in guard plate 26. Bolts (not shown) are screwed through the holes in the guard plate and into bolt holes 120 thus mounting bracket 112 and sensor assembly 28 to guard plate 26. Guard plate 26 is mounted to body assembly 16.

In operation, actuation of motor M causes shaft 115 to rotate. Rotation of shaft 115 causes body assembly 16 to rotate since the motor M is mounted on body assembly 16. Rotation of shaft 115 also causes sensor shaft 62 to rotate since the sensor shaft is mechanically coupled to shaft 115. Rotation of sensor shaft 62 relative to sensor body 60 causes sensor 58 to send electrical signals through wires (not shown) to circuit board 86. Circuit board 86 amplifies the electrical signals in a well known manner and sends the amplified electrical signals to a computer located on earth working apparatus 10.

The wires connected between circuit board 86 and the computer enter housing 30 through passageway 96 defined in cap 94. An O-ring is disposed around the wires, and placed in contact with wall segment 100 (see FIG. 6) to prevent any material from entering chamber 38 (see FIG. 4) through passageway 96. As a result of the above described arrangement, sensor 58 is protected from environmental contaminants while the computer receives information relating to the spatial relationship between body assembly 16 and track assembly 14.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An earth working apparatus, comprising:
   a first machine component, said first machine component including a track assembly;
   a second machine component which is movable relative to said first machine component, said second machine component including a body assembly;
   a motor for moving said second machine component relative to said first machine component, wherein said motor includes a motor shaft; and
   a sensor assembly for determining the position of said motor shaft, wherein said sensor assembly includes:
      a housing secured to said first machine component, said housing having a chamber defined therein;
      a sensor positioned within said chamber of said housing, wherein (1) said sensor includes a sensor body and a sensor shaft, (2) said sensor body is fixed in relation to said housing, and (3) said sensor shaft is movable in relation to said housing; and
      a linkage assembly which mechanically couples said motor shaft to said sensor shaft.

2. The apparatus of claim 1, wherein said body assembly includes a cab and an engine enclosure.

3. The apparatus of claim 1, wherein said linkage assembly includes a set of reduction gears so that when said motor shaft rotates at a first speed, said sensor shaft is caused to rotate at a second speed which is less than said first speed.

4. The apparatus of claim 3, wherein said set of reduction gears defines a worm gear reduction unit.

5. The apparatus of claim 4, wherein said worm gear reduction unit provides a gear reduction ratio of 100/1.

6. The apparatus of claim 1, wherein said sensor body is completely enclosed within said housing.

7. The apparatus of claim 1, wherein:
   said linkage assembly further includes a first coupler ant a second coupler,
   said first coupler is connected to said sensor shaft, and
   said second coupler is connected to said motor shaft.

8. The apparatus of claim 1, further comprising a bracket, wherein:
   said housing includes a plurality of screw holes,
   a plurality of screws are respectively received in said plurality of screw holes so as to secure said bracket to said housing,
   said housing includes an inner housing surface and an outer housing surface, and
   each of said plurality of screw holes terminate at a location intermediate said inner housing surface and said outer housing surface.

* * * * *